(12) United States Patent
Radke et al.

(10) Patent No.: US 9,303,544 B2
(45) Date of Patent: Apr. 5, 2016

(54) METHOD OF DETECTING A THERMAL EVENT IN AN EXHAUST SYSTEM BASED ON TEMPERATURE GRADIENTS AND EXHAUST SYSTEM CONFIGURED FOR SAME

(75) Inventors: Benjamin Radke, Waterford, MI (US); Vincent J. Tylutki, Livonia, MI (US); Janean E. Kowalkowski, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 989 days.

(21) Appl. No.: 13/352,718

(22) Filed: Jan. 18, 2012

(65) Prior Publication Data

US 2013/0180229 A1 Jul. 18, 2013

(51) Int. Cl.
*F02B 27/04* (2006.01)
*F01N 11/00* (2006.01)
*F02D 41/22* (2006.01)
*F02D 41/14* (2006.01)
*F02D 41/02* (2006.01)

(52) U.S. Cl.
CPC ............ *F01N 11/00* (2013.01); *F02D 41/1446* (2013.01); *F02D 41/22* (2013.01); *F01N 2550/00* (2013.01); *F01N 2560/06* (2013.01); *F01N 2900/1602* (2013.01); *F02D 2041/0265* (2013.01); *F02D 2200/0802* (2013.01); *F02D 2400/08* (2013.01); *Y02T 10/40* (2013.01); *Y02T 10/47* (2013.01)

(58) Field of Classification Search
CPC . F01N 11/00; F01N 2550/00; F01N 2560/06; F01N 2900/1602; F02D 41/22; F02D 41/1446

USPC .................................................... 60/273, 277
See application file for complete search history.

(56) References Cited

U.S. PATENT DOCUMENTS

| 6,245,306 B1 * | 6/2001 | Miyazaki et al. .... B10D 53/945 423/213.5 |
| 7,684,924 B2 | 3/2010 | Darr et al. |
| 2009/0282811 A1 | 11/2009 | Crosbie |
| 2010/0101215 A1 | 4/2010 | Wu et al. |
| 2011/0061372 A1 | 3/2011 | Levijoki et al. |
| 2011/0099982 A1 | 5/2011 | Berke et al. |
| 2011/0143449 A1 | 6/2011 | Lana et al. |
| 2011/0232363 A1 | 9/2011 | Schoemig et al. |

FOREIGN PATENT DOCUMENTS

| CN | 101581247 A | 11/2009 |
| DE | 4344137 A1 | 6/1995 |
| DE | 10053828 A1 | 5/2002 |

(Continued)

*Primary Examiner* — Jason Shanske
(74) *Attorney, Agent, or Firm* — Quinn Law Group, PLLC

(57) ABSTRACT

A method of detecting a thermal event is provided that relies not only on monitored exhaust temperatures, but also on temperature gradients propagating in the direction of exhaust flow. Specifically, the method of detecting a thermal event in a vehicle exhaust system includes monitoring at least one operating parameter at multiple locations spaced in exhaust flow of the vehicle exhaust system. The method then includes initiating a protective action if the monitoring indicates that at least one respective predetermined temperature requirement and a respective predetermined temperature gradient requirement are exceeded at two of the multiple temperature sensor locations within a predetermined time period.

16 Claims, 3 Drawing Sheets

(56) References Cited

FOREIGN PATENT DOCUMENTS

| DE | 102008030520 A1 | 1/2009 |
| DE | 102010036153 A1 | 3/2011 |
| EP | 2317090 A1 | 5/2011 |

* cited by examiner

METHOD OF DETECTING A THERMAL EVENT IN AN EXHAUST SYSTEM BASED ON TEMPERATURE GRADIENTS AND EXHAUST SYSTEM CONFIGURED FOR SAME

TECHNICAL FIELD

The present teachings generally include a method of detecting a thermal event in an exhaust system and an exhaust system having a controller configured to carry out the method.

BACKGROUND

Vehicle exhaust systems often include exhaust after-treatment devices that filter or otherwise treat the exhaust prior to releasing the exhaust into the environment. The after-treatment devices can be damaged if the exhaust temperatures become too high. Temperature sensors are sometimes placed in the exhaust system, and a controller monitors temperature data received from the temperature sensors.

Some control systems rely on data from temperature sensors to detect a thermal event. For example, one system determines that there is a thermal event, and initiates a protective action, when two sensors indicate that a predetermined temperature has been reached for a predetermined amount of time. A "thermal event" is an exhaust system operating condition or set of conditions that have been determined to potentially lead to component damage. Accordingly, it is desirable that control systems anticipate, prevent, or quickly limit the duration of a thermal event.

SUMMARY

Thermal protection control systems that rely only on temperature readings of temperature sensors may not be completely accurate. For example, if a thermal event causes the circuit of a temperature sensor to open, the temperature sensor reading will default to indicate either a very low temperature or a reading at the highest possible value. Neither of these default values is likely to accurately represent the exhaust temperature.

A method of detecting a thermal event is provided that relies not only on monitored exhaust temperatures, but also on temperature gradients propagating in the direction of exhaust flow. Specifically, a method of detecting a thermal event in a vehicle exhaust system includes monitoring at least one operating parameter, which may be exhaust temperature as measured by temperature sensors, at multiple locations spaced in exhaust flow of the vehicle exhaust system. The method then includes initiating a protective action if the monitoring indicates that at least one respective predetermined temperature requirement and a respective predetermined temperature gradient requirement are exceeded at two of the multiple temperature sensor locations within a predetermined time period. The method thus predicts when a thermal event exists that is capable of damage to the exhaust system. The predetermined time period may be a heat transport delay time calibrated for the exhaust system.

The predetermined temperature requirement that is monitored may include both a predetermined minimum temperature and a predetermined maximum temperature. For example, in one embodiment, based on the temperature data, for each one of the temperature sensors, the method determines whether exhaust flow temperature exceeds a respective predetermined minimum temperature, and then determines whether a respective predetermined temperature gradient is exceeded if the exhaust flow temperature exceeds the respective predetermined minimum temperature. If the respective predetermined temperature gradient is exceeded, the method then determines whether a respective maximum predetermined temperature is exceeded for a predetermined period of time. A detection flag may be set for the predetermined time period if the respective maximum predetermined temperature is exceeded for the predetermined period of time. If two detection flags are set, the protective action is then initiated. Because two detection flags have been set, the method more reliably indicates that excessive temperatures are propagating through the exhaust system. Typical large temperature gradients and typical high temperatures not warranting a protective action will not cause a false indication of a thermal event, because these generally do not occur at two different temperature sensors within the transport delay period.

The protective action taken may be, but is not limited to, providing an alert to the vehicle operator, limiting engine power, limiting accelerator position, or any combination of these.

As used herein, monitoring exhaust temperatures or monitoring a temperature gradient in the exhaust can be accomplished using temperature sensors and historical stored data from the sensors. Alternatively, exhaust temperature and exhaust temperature gradients can be monitored based on other operating parameters from which temperature and temperature gradient are determined. e.g., from a stored look-up table in which values of monitored operating parameters correspond with a temperature and temperature gradient.

The above features and advantages and other features and advantages of the present teachings are readily apparent from the following detailed description of the best modes for carrying out the present teachings when taken in connection with the accompanying drawings.

DETAILED DESCRIPTION

Figure 1:
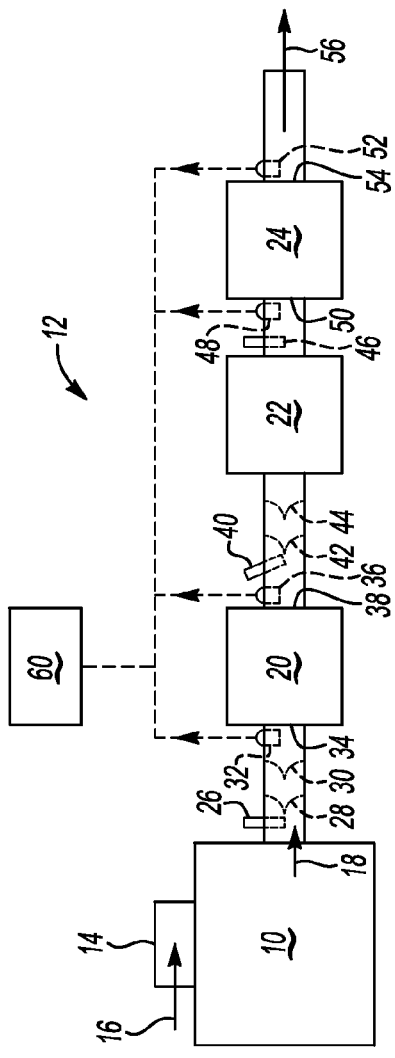
FIG. 1 is a schematic illustration of an engine with an exhaust system for a vehicle, and a controller configured to detect a thermal event in the exhaust system.

Referring to the drawings, wherein like reference numbers refer to like components throughout the several views, FIG. 1 shows a vehicle engine 10 and an exhaust system 12. The engine 10 has an air and fuel intake system 14 through which intake air 16 flows to the engine 10. Exhaust flow 18 from the engine 10 enters the exhaust system 12. In this embodiment, the engine 10 is a diesel engine, and the exhaust system 12 has a diesel oxidation catalyst (DOC) 20, a selective catalyst reduction (SCR) 22, and a diesel particulate filter (DPF) 24.

A liquid injector 26, such as for injecting hydrocarbon fuel, is positioned upstream of mixers 28, 30. A temperature sensor 32 is positioned in communication with the exhaust flow just upstream of an inlet 34 of the DOC 20. The DOC 20 oxidizes and burns hydrocarbons in the exhaust flow 18 exiting the engine 10. Another temperature sensor 36 is positioned in communication with the exhaust flow just downstream of an outlet 38 of the DOC 20.

A diesel exhaust fluid (DEF) injector 40 injects diesel exhaust fluid or urea into the exhaust stream, which is then mixed by DEF mixers 42 and 44 before entering the SCR 22, where the injected liquid aids the SCR 22 in converting at least some of the nitrogen oxides in the exhaust flow into nitrogen and water. A nitrogen oxide sensor 46 is positioned in the exhaust stream downstream of an outlet of the SCR 22.

The exhaust then flows to an inlet 50 of the DPF 24. A temperature sensor 48 is positioned adjacent the inlet 50 in communication with the exhaust flow. A temperature sensor 52 is positioned adjacent an outlet 54 of the DPF 24 in communication with the exhaust flow. The exhaust exits the exhaust system 12 downstream of the DPF 24, as indicated by arrow 56.

The DOC 20, the SCR 22 and the DPF 24 are referred to as exhaust after-treatment devices. One or more of the exhaust after-treatment devices or the temperature sensors 32, 36, 48, 52 or other components of the exhaust system 12 could be damaged if the exhaust temperature rises too high for a prolonged period of time. When operating conditions exist under which such damage may occur, it is referred to as a thermal event. Certain protective actions can be taken to reduce the exhaust temperature, such as limiting the engine power, limiting the vehicle accelerator position, and/or notifying the vehicle operator of excessive temperatures, such as with a notification in an information display.

To protect the exhaust system 12 from a thermal event, a controller 60 is operatively connected to the temperature sensors 32, 36, 48, 52. As shown in more detail in FIG. 4, the controller 60 receives signals 62 indicative of vehicle operating conditions, including temperature data from the temperature sensors 32, 36, 48, 52. The controller 60 has a processor 64 that executes an algorithm 100 (described in greater detail with respect to FIG. 5) to determine the existence of a thermal event and then send a control signal 68 to initiate a protective action 72 through a protection module 70 that takes into account other vehicle operating conditions to determine which protective action should be commanded. The processor 64 references a stored look-up table 74 that correlates the data received from the temperature sensors 32, 36, 48, 52 with reference exhaust temperatures to assist the algorithm 100 in determining a thermal event.

Figure 3:
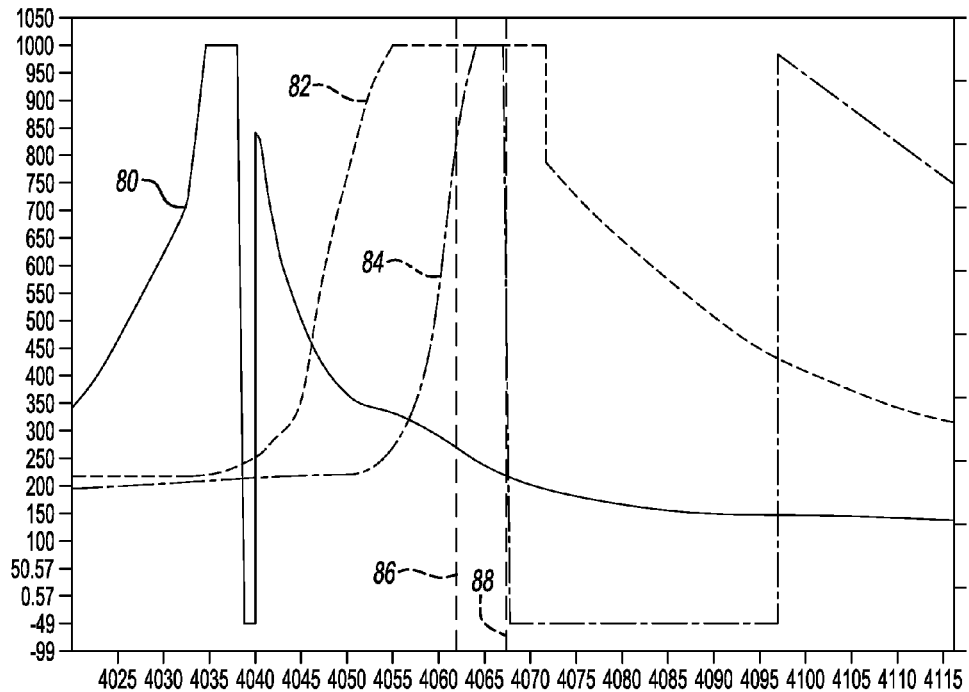
FIG. 3 is a plot of temperature in degrees Celsius versus time in seconds for various temperature sensors in the exhaust system of FIG. 1.

FIG. 3 shows plots of temperatures in degrees Celsius of the exhaust flow over time in seconds for some of the temperature sensors of FIG. 1. Specifically, curve 80 is the temperature of the exhaust flow substantially at the outlet 38 of the DOC 20 based on data received from the temperature sensor 36. The curve 82 is the temperature of the exhaust flow substantially at the inlet 50 of the DPF 24 based on data received from the temperature sensor 48. The curve 84 is the temperature of the exhaust flow substantially at the outlet 54 of the DPF 24 based on data received from the temperature sensor 52. The controller 60 utilizes the data received from the sensors 32, 36, 48, 52 in carrying out the algorithm 100.

Figure 5:
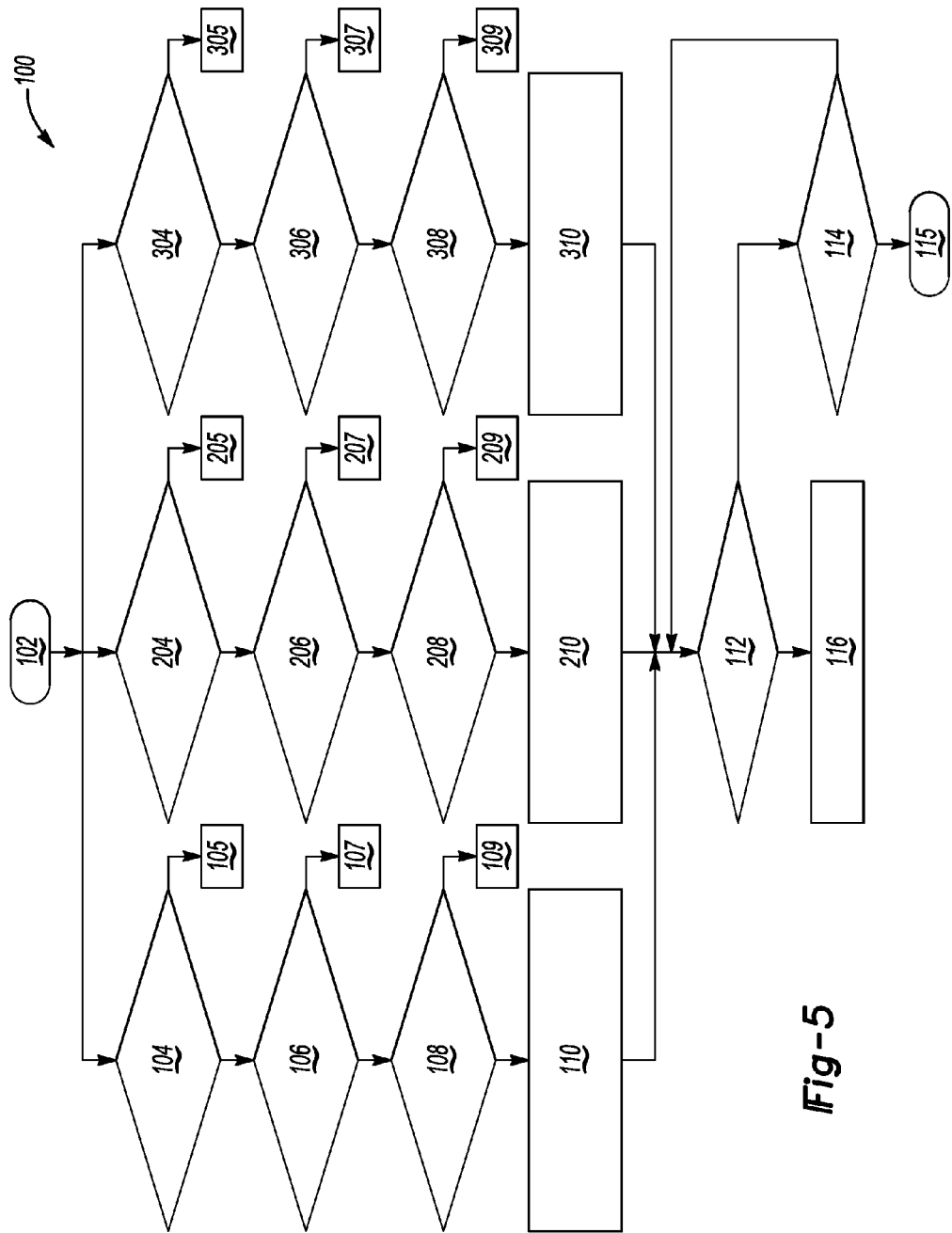
FIG. 5 is a flow diagram of a method of detecting a thermal event in the exhaust system of FIGS. 1 and 2 as carried out by the controller of FIG. 4.

Specifically, referring to FIG. 5, the algorithm 100, which is also referred to as a method of detecting a thermal event in a vehicle exhaust system, such as the exhaust system 12 of FIG. 1, begins with step 102, in which the controller 60 receives signals 62 indicative of exhaust temperature data from the temperature sensors 32, 36, 48, 52. Based on the data received, the algorithm 100 carries out a number of subsequent steps for each of the temperature sensors in parallel to determined if a thermal event exists. The flow diagram of FIG. 5 shows the algorithm 100 carrying out the steps for the temperature sensors 36, 48 and 52. Although not shown, the same steps may be carried out for the temperature sensor 32, and for any other temperature sensors optionally included in various locations in the exhaust flow.

After temperature data 62 is received by the controller 60 in step 102, the algorithm 100 moves to step 104 and determines whether the exhaust temperature at the sensor 36 exceeds a predetermined minimum temperature, such as but mot limited to, 300 degrees Celsius. If the temperature does not exceed the predetermined minimum temperature, the algorithm 100 exits at step 105 and returns to step 102. In FIG. 3, for example, the exhaust temperature at the sensor 36 (curve 80) exceeds the predetermined minimum temperature of 300 degrees Celsius until about the time 4060 seconds, except between the time 4037 seconds and 4040 seconds.

If the temperature exceeds the predetermined minimum temperature, then the algorithm 100 proceeds to step 106 in which it is determined whether a predetermined temperature gradient is exceeded. The temperature gradient is a predetermined large increase in temperature over time for exhaust flow at the sensor 36 that may be associated with a thermal event. For example, the predetermined temperature gradient may be an increase of 50 degrees Celsius per second. If the temperature gradient does not exceed the predetermined temperature gradient, then the algorithm 100 exits at step 107 and returns to step 102.

If the predetermined temperature gradient is exceeded, then the algorithm proceeds to step 108 in which it is determined whether a maximum predetermined temperature is exceeded for a predetermined period of time. For example, the maximum predetermined temperature may be 800 degrees Celsius and the predetermined period of time may be six seconds. If the temperature of the exhaust as indicted by the sensor 36 does not exceed the maximum predetermined temperature for the predetermined period of time, then the algorithm 100 exits at step 109 and returns to step 102. It appears from the curve 80 that the exhaust temperature based on data received at the sensor 36 does not exceed 800 degrees Celsius for six seconds, and so the algorithm 100 would exit at step 109 and return to step 102.

Assuming that the temperature of the exhaust as indicated by the sensor 36 does exceed the maximum predetermined temperature for the predetermined period of time, then the algorithm 100 proceeds to step 110, in which the algorithm 100 sets a flag that remains set for a predetermined time period, which may be a calibratable heat transport delay time. As used herein, as will be readily understood by those skilled in the art, a "flag" is an indicator, that may be set or unset, and is used to indicate a condition in the execution of a computer algorithm. In this instance, the flag set in step 110 is an indicator that the determinations of steps 104, 106 and 108 are positive. The calibratable heat transport delay time is the amount of time it takes for heat to propagate in the direction of exhaust flow in the exhaust system 12, as indicated by testing performed on the exhaust system 12. For example, the calibratable heat transport delay time may be the amount of time it takes for the predetermined temperature gradient used in step 106 to move from the sensor 36 to the temperature sensor 48. In the embodiment of FIG. 1, the calibratable heat transport delay time may be six seconds.

The steps 102, 104, 106, 108, 110 and 112 are together referred to as monitoring the exhaust temperature at the various temperature sensor locations of the exhaust system 12.

At the same time that steps 104, 106, 108 and 110 are being carried out, the algorithm 100 is simultaneously carrying out similar steps 204, 206, 208 and 210 for the temperature sensor 48, and steps 304, 306, 308 and 310 for the temperature sensor 52, based on the data received in step 102. In step 204, it is determined whether the exhaust temperature at the sensor 48 exceeds a predetermined minimum temperature. The predetermined minimum temperature may be the same as that used in step 104, such as 300 degrees Celsius, or a different predetermined minimum temperature used for sensor 48. If the temperature does not exceed the predetermined minimum temperature, the algorithm exits at step 205 and returns to step 102. In FIG. 3, for example, the exhaust flow at the sensor 48 (curve 82) would exceed the predetermined minimum temperature of 300 degrees Celsius beginning at about time 4044 seconds and throughout the remainder of the plot.

If the temperature exceeds the predetermined minimum temperature, then the algorithm 100 proceeds to step 206 in which it is determined whether a predetermined temperature gradient is exceeded. The temperature gradient is a predetermined large increase in temperature over time for exhaust flow at the sensor 48 that may be associated with a thermal event. The predetermined temperature gradient used in step 206 may be the same or different than the predetermined temperature gradient used in step 106. For example, the predetermined temperature gradient may be an increase of 50 degrees Celsius per second. If the temperature gradient determined in step 206 does not exceed the predetermined temperature gradient, then the algorithm 100 exits at step 207 and returns to step 102. In FIG. 3, it appears that the predetermined temperature gradient of 50 degrees Celsius per second may be exceeded when the minimum temperature of 300 degrees Celsius is exceeded between the times 4047 seconds and 4053 seconds and about 350 degrees Celsius and 900 degrees Celsius.

If the predetermined temperature gradient is exceeded, then the algorithm 100 proceeds to step 208 in which it is determined whether a maximum predetermined temperature is exceeded for a predetermined period of time. For example, the maximum predetermined temperature may be 800 degrees Celsius and the predetermined period of time may be six seconds. If the temperature of the exhaust as indicted by the sensor 48 does not exceed the maximum predetermined temperature for the predetermined period of time, then the algorithm 100 exits at step 209 and returns to step 102. It appears from the curve 82 that the exhaust temperature based on data received at the sensor 48 exceeds 800 degrees Celsius between about time 4051 seconds and 4072 seconds which is more than the predetermined period of time.

Assuming that the temperature of the exhaust as indicated by the sensor 48 exceeds the maximum predetermined temperature for the predetermined period of time, then the algorithm 100 proceeds to step 210, in which the algorithm 100 sets a flag that remains set for a predetermined time period, which may be the calibratable heat transport delay time. That is, after the data indicates a temperature greater than 800 degrees Celsius for six seconds, a flag is set for the predetermined time period, which is also six seconds in this example. Accordingly, at about 4057 seconds, a flag is set that remains set until the time 4063 seconds.

The same steps are carried out with respect to sensor 52. In step 304, it is determined whether the exhaust temperature at the sensor 52 exceeds a predetermined minimum temperature. The predetermined minimum temperature may be the same as that used in step 104, such as 300 degrees Celsius, or a different predetermined minimum temperature used for sensor 52. If the temperature does not exceed the predetermined minimum temperature, the algorithm 100 exits at step 305 and returns to step 102. In FIG. 3, for example, the exhaust flow at the sensor 52 (curve 84) would exceed the predetermined minimum temperature of 300 degrees Celsius beginning at about time 4057 seconds until about 4067 seconds.

If the temperature exceeds the predetermined minimum temperature, then the algorithm 100 proceeds to step 306 in which it is determined whether a predetermined temperature gradient is exceeded. The temperature gradient is a predetermined large increase in temperature over time for exhaust flow at the sensor 52 that may be associated with a thermal event. The predetermined temperature gradient used in step 306 may be the same or different than the predetermined temperature gradient used in step 106. For example, the predetermined temperature gradient may be an increase of 50 degrees Celsius per second. If the temperature gradient does not exceed the predetermined temperature gradient, then the algorithm 100 exits at step 307 and returns to step 102. In FIG. 3, it appears that the predetermined temperature gradient of 50 degrees Celsius per second may be exceeded when the minimum temperature of 300 degrees Celsius is exceeded between the times 4057 seconds (approximately 400 degrees Celsius) and 4063 seconds (approximately 1000 degrees Celsius).

If the predetermined temperature gradient is exceeded, then the algorithm 100 proceeds to step 308 in which it is determined whether a maximum predetermined temperature is exceeded for a predetermined period of time. For example, the maximum predetermined temperature may be 800 degrees Celsius and the predetermined period of time may be six seconds. If the temperature of the exhaust as indicted by the sensor 52 does not exceed the maximum predetermined temperature for the predetermined period of time, then the algorithm 100 exits at step 309 and returns to step 102. It appears from the curve 84 that the exhaust temperature based on data received at the sensor 52 exceeds 800 degrees Celsius between about time 4062 seconds and 4068 seconds, which satisfies the six second predetermined period of time.

Assuming that the temperature of the exhaust as indicated by the sensor 52 exceeds the maximum predetermined temperature for the predetermined period of time, then the algorithm 100 proceeds to step 310, in which the algorithm 100 sets a flag for the sensor 52 that remains set for a predetermined time period, which may be the calibratable heat transport delay time. In FIG. 3, the vertical line 86 at approximately 4062 seconds indicates the beginning of the predetermined period of time. The line 88 indicates the end of the predetermined period of time. Because the temperature remains above 800 degrees Celsius for the six second predetermined period of time, as indicated by curve 84, a flag is set at the time 4068 seconds and remains set until 4074 seconds (the end of the predetermined time period, which is also six seconds in this embodiment).

Following any of steps 110, 210, 310, if a flag was set for any of the sensors 36, 48, 52, respectively, in step 112, the algorithm 100 determines whether at least two flags are concurrently set. Any flag set in step 110, 210 or 310 remains set for the predetermined heat transport delay time. In step 112, if it is determined that two flags are not concurrently set, the algorithm 100 moves to step 114, in which it is determined whether the predetermined time period has passed since the flag was set. If the predetermined time period has passed, the algorithm exits at step 115 and returns to step 102 to continue monitoring the exhaust system 12 for a thermal event. If the predetermined time period has not passed, the algorithm 100 returns to step 112 and again queries whether the two flags are concurrently set. The algorithm 100 continues to loop through steps 112 and 114 until either the predetermined time period passes without an additional flag being set, or the algorithm 100 recognizes that an additional flag has also been set via one of the steps 110, 210 or 310 prior to the predetermined time period expiring since the first of the flags was set. In the latter case, the algorithm 100 recognizes this as a thermal event, and moves to step 116 to initiate a protective action, which may also be referred to as setting a thermal protection fault. The protective action may be one or more of many protective steps taken to protect the exhaust system 12 from damage.

For example, referring to FIG. 3, the processor 74 will send a signal 69 to the protection control module 70 indicating a thermal event (that is, a positive determination in step 112). The protection control module 70 is configured to determine which of many potential protective actions should be taken. A control signal 68 is then sent to initiate the protective action 72. The protective action 72 may be alerting the vehicle operator of the thermal event, such as by a message on an information display, an audio signal, or the like. The alert may instruct the operator to have the exhaust system serviced. The protective action 72 may be placing a maximum power output on the engine 10 to limit additional heat to the exhaust system 12. The protective action 72 may be controlling an actuator that limits the maximum position of an accelerator. This in turn has the affect of limiting the maximum engine power. These protective actions may be taken alone or in combination.

Figure 2:
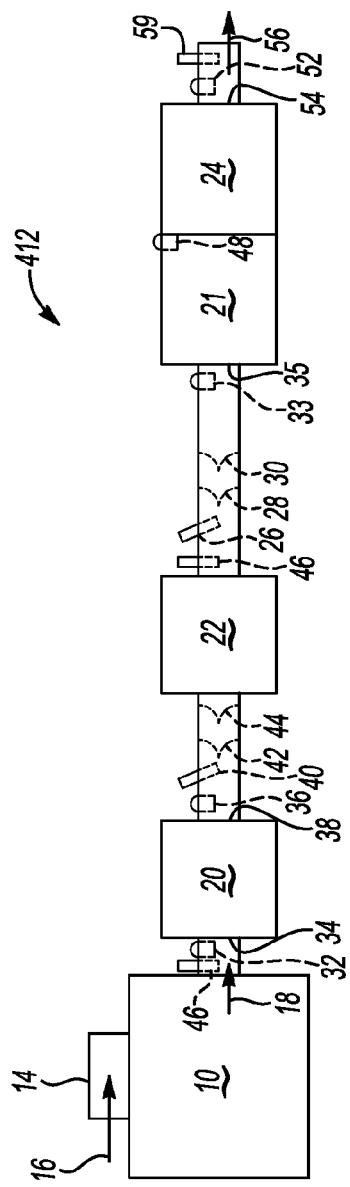
FIG. 2 is a schematic illustration of another engine with another exhaust system, and a controller configured to detect a thermal event in the exhaust system, in accordance with an alternative aspect of the present teachings.
Figure 4:
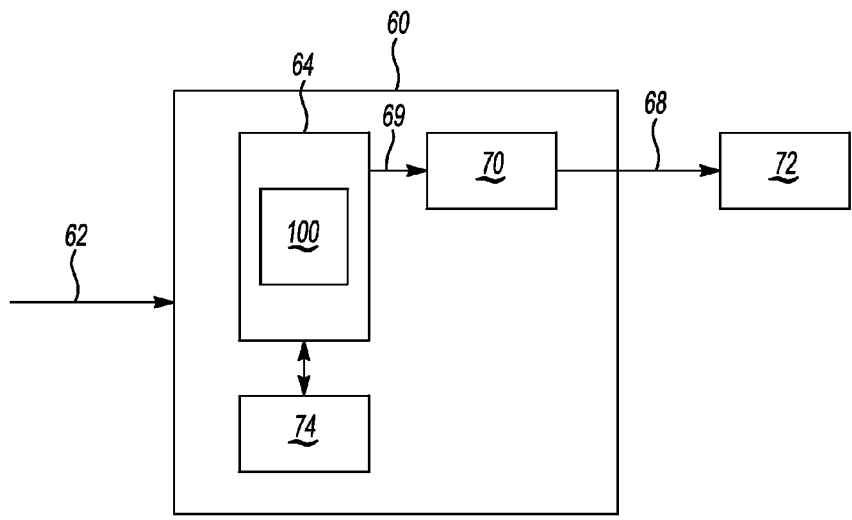
FIG. 4 is a schematic illustration of the controller of FIGS. 1 and 2.

Referring to FIG. 2, an alternative embodiment of an exhaust system 412 can also be protected using the controller 60 and algorithm 100 of FIGS. 4 and 5. The exhaust system 412 has many of the same components as shown and described in the exhaust system 12 or FIG. 1. These components are labeled with the same reference numbers and function as described with respect to FIG. 1. The exhaust system 412 has a nitrogen oxide sensor 46 upstream of the DOC 20 as well as a temperature sensor 32 adjacent the inlet 34 of the DOC 20. The exhaust system 412 also has a temperature sensor 36 adjacent the outlet 38 of the DOC 20. A DEF injector 40 and mixers 42, 44 are upstream of the SCR 22. Another nitrogen oxide sensor 46 is downstream of the SCR 22 followed by two mixers 28, 30. Another temperature sensor 33 is positioned adjacent an inlet 35 of a second diesel oxidation catalyst (DOC) 21. A temperature sensor 48 is placed at the outlet of the DOC 21 and the inlet of a DPF 24. Another temperature sensor 52 is at the outlet 54 of the DPF 24. A particulate matter sensor 59 is also placed just prior to the exit of the exhaust system 412, indicated at arrow 56.

The algorithm 100 can be applied to the exhaust system 412, with each of the temperature sensors 32, 36, 33, 48 and 52 providing temperature data to the controller 60. The steps 104, 106, 108, 110 are applied to each of the sensors 32, 36, 33, 48 and 52 in parallel, and the determination of whether two flags are concurrently set in step 112, leading to a protective action in step 116 is applied to the exhaust system 412.

The steps 102, 104 through 112, 204 through 112, and 304 through 112 are together referred to as monitoring the exhaust temperature at the various temperature sensor locations of the exhaust system 12. This monitoring, together with the protective action of step 116, allows an identification of a thermal event that necessitates a thermal action based on a thermal gradient propagating through the exhaust system, and relies on identifying thermal indicators at two different sensors spaced in the exhaust system both of which cause flags to be set within a predetermined time period. Under the method 100, operating conditions most likely to cause damage to the exhaust system 12 or 412 can be alleviated, while normal spikes in temperature that do not warrant protective action are prevented from being identified as a thermal event.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A method of detecting a thermal event in a vehicle exhaust system comprising:
   monitoring at least one operating parameter at multiple locations spaced in an exhaust flow of the vehicle exhaust system;
   initiating a protective action if said monitoring indicates that at least one respective predetermined temperature requirement and a respective predetermined temperature gradient requirement are exceeded at two of said multiple locations within a predetermined time period; and
   wherein the predetermined temperature gradient requirement is a change in temperature per unit of time.

2. The method of claim 1, wherein said at least one respective predetermined temperature requirement includes a predetermined minimum temperature.

3. The method of claim 1, wherein said at least one respective predetermined temperature requirement includes a predetermined maximum temperature exceeded for at least a predetermined period of time.

4. The method of claim 1, wherein said at least one operating parameter is a temperature of said exhaust flow as measured by temperature sensors.

5. The method of claim 1, wherein said predetermined time period is based on a heat transport delay time calibrated for the exhaust system.

6. The method of claim 1, wherein said multiple locations include at least one of a location at an outlet of a diesel oxidation catalyst, a location at an inlet of a diesel particulate filter, and a location at an outlet of a diesel particulate filter.

7. The method of claim 1, wherein said protective action includes at least one of providing an operator alert, limiting engine power, and limiting accelerator position.

8. A method of detecting a thermal event in a vehicle exhaust system comprising:
   receiving signals indicative of temperature data from temperature sensors placed at multiple locations in exhaust flow of the vehicle exhaust system;
   based on the temperature data, for each one of said temperature sensors:
      determining whether exhaust flow temperature exceeds a respective predetermined minimum temperature;
      determining whether a respective predetermined temperature gradient is exceeded if the exhaust flow temperature exceeds the respective predetermined minimum temperature; and
      determining whether a respective maximum predetermined temperature is exceeded for a predetermined period of time if the respective predetermined temperature gradient is exceeded;
      setting a detection flag for a predetermined time period if the respective maximum predetermined temperature is exceeded for the predetermined period of time; wherein said predetermined time period is a calibrated heat transport delay time; and
   initiating a protective action if the detection flag is set for two of said temperature sensors concurrently.

9. The method of claim 8, wherein said multiple locations include at least one of a location at an outlet of a diesel oxidation catalyst, a location at an inlet of a diesel particulate filter, and a location at an outlet of a diesel particulate filter.

10. The method of claim 8, wherein said protective action includes at least one of providing an operator alert, limiting engine power, and limiting accelerator position.

11. The method of claim 8, wherein said respective maximum predetermined temperature for each of said temperature sensors is 800 degrees Celsius and said predetermined period of time is six seconds.

12. An exhaust flow system for a vehicle comprising:
- at least one exhaust after-treatment device positioned in exhaust flow;
- multiple temperature sensors positioned at multiple locations with respect to said at least one exhaust after-treatment device and operable to measure exhaust temperature;
- a controller operatively connected to the multiple temperature sensors and configured with a processor that executes an algorithm that for each of said temperature sensors:
    - determines whether a respective minimum predetermined temperature is exceeded;
    - determines whether a respective predetermined temperature gradient is exceeded if the respective minimum predetermined temperature is exceeded;
    - determines whether a respective maximum predetermined temperature is exceeded for a predetermined period of time if the respective predetermined temperature gradient is exceeded;
    - sets a detection flag for a predetermined time period if the respective second predetermined temperature is exceeded for the predetermined period of time; and
    - initiates a protective action to protect the after-treatment device if the detection flag is set for two of said temperature sensors concurrently.

13. The exhaust flow system of claim 12, wherein the predetermined time period is a heat transport delay time calibrated for the exhaust flow system.

14. The exhaust flow system of claim 12, wherein said protective action includes at least one of providing an operator alert, limiting engine power, and limiting accelerator position.

15. The method of claim 1, wherein said multiple locations are spaced in the direction of exhaust flow.

16. The method of claim 8, wherein said multiple locations are spaced in the direction of exhaust flow.

* * * * *